June 28, 1955 W. A. HARPER 2,711,903
GRAIN DRILL DRIVE
Filed July 11, 1950 6 Sheets-Sheet 1

INVENTOR
WESLEY A HARPER
By Toulmin & Toulmin
ATTORNEYS

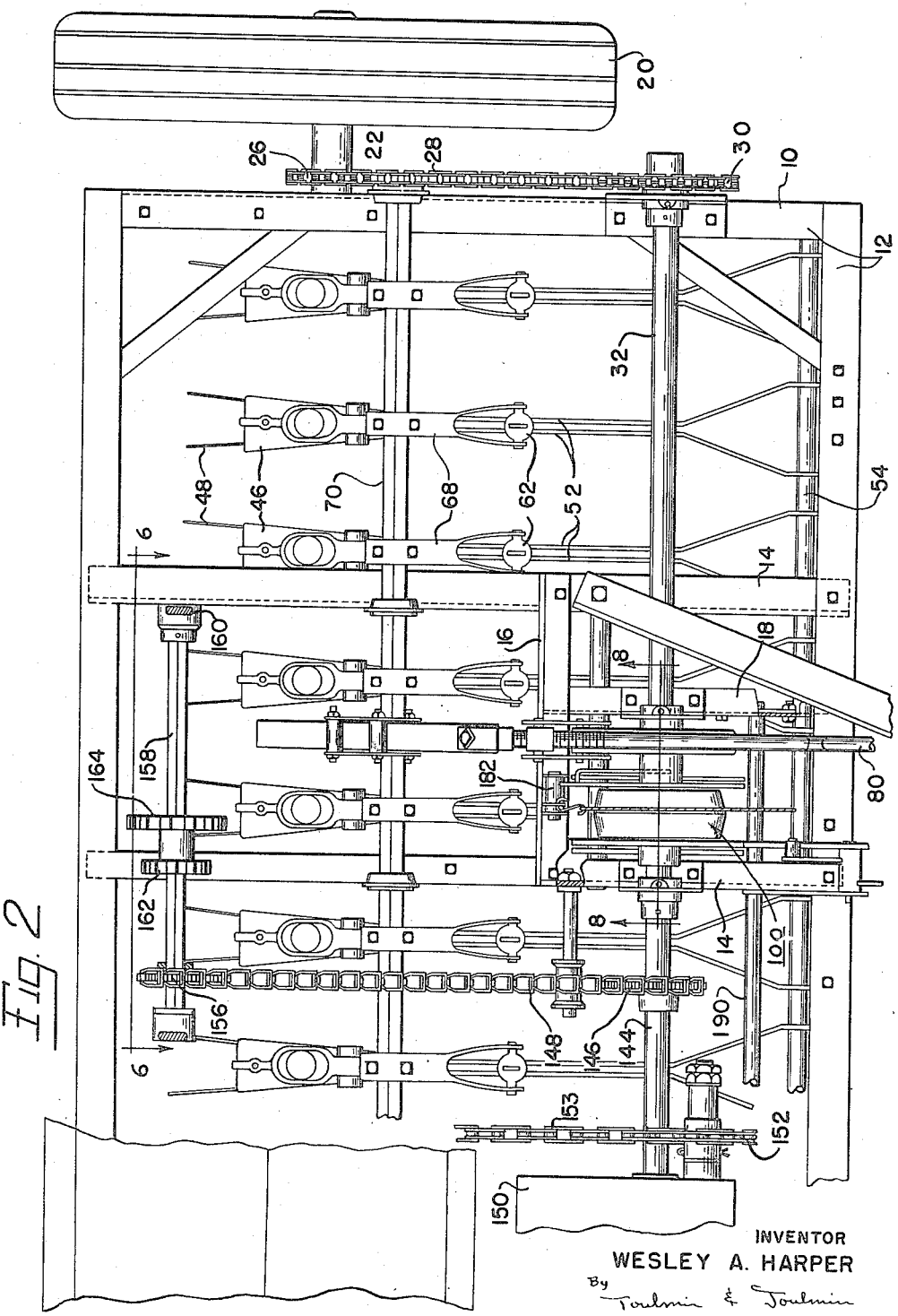

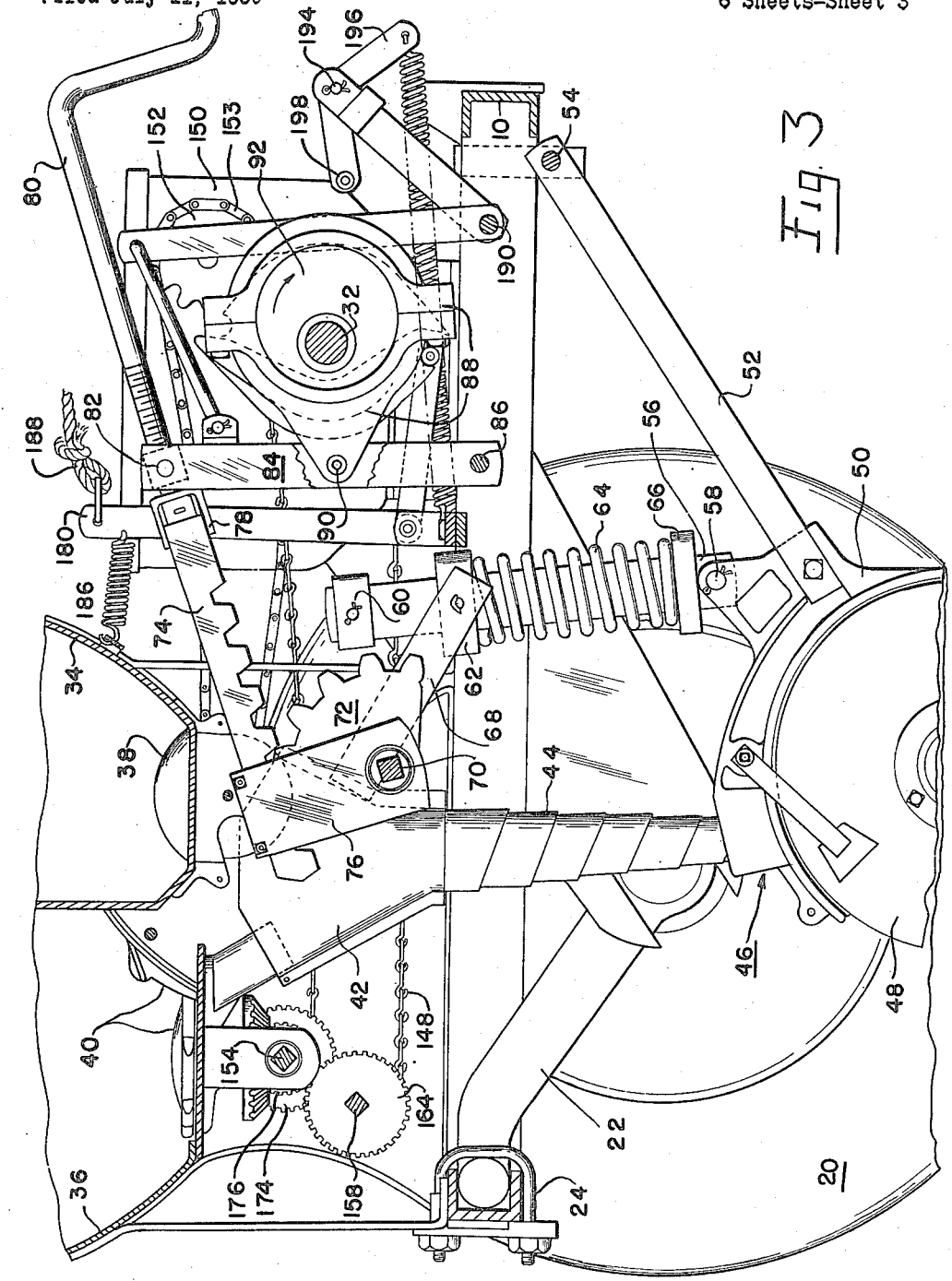

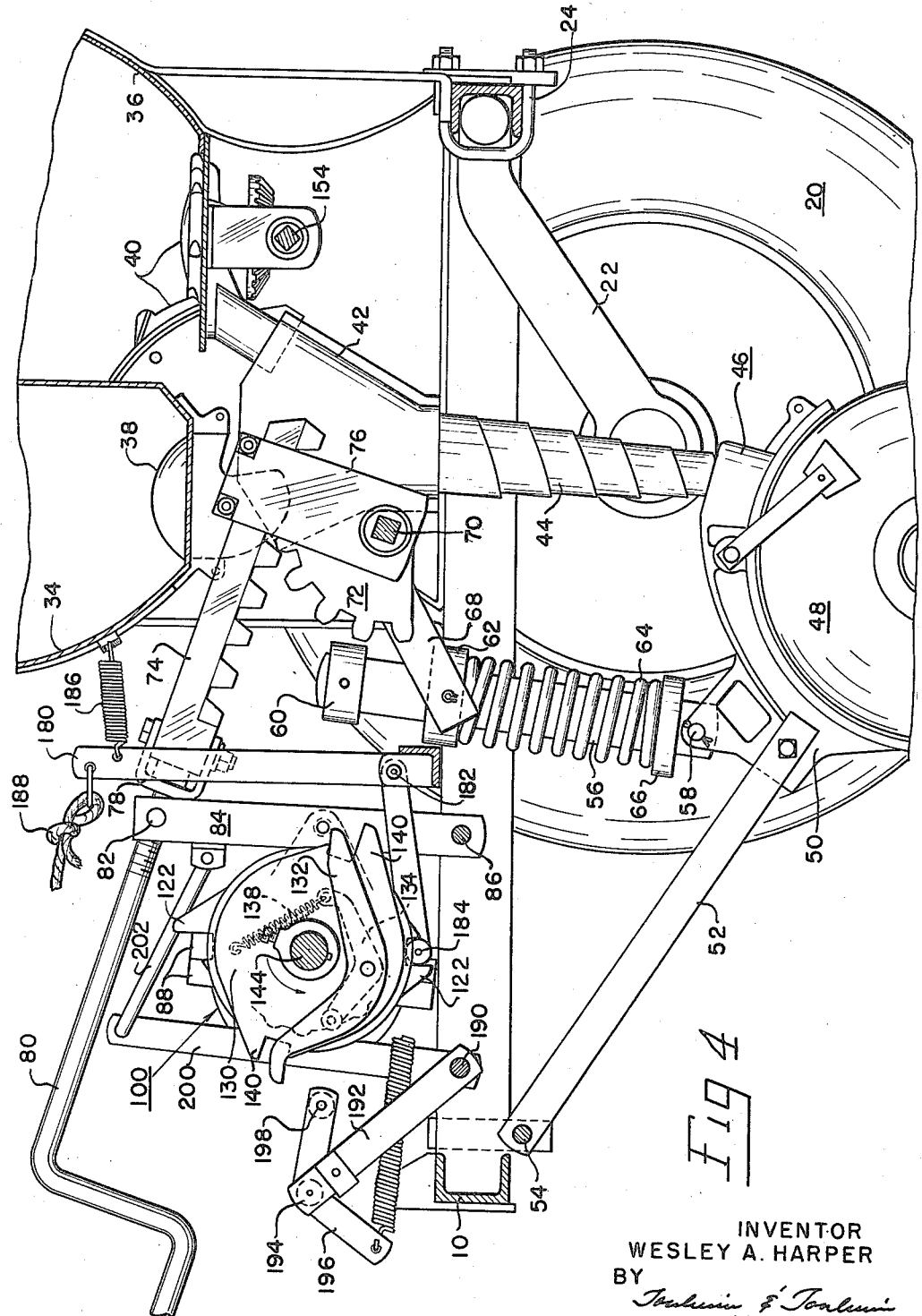

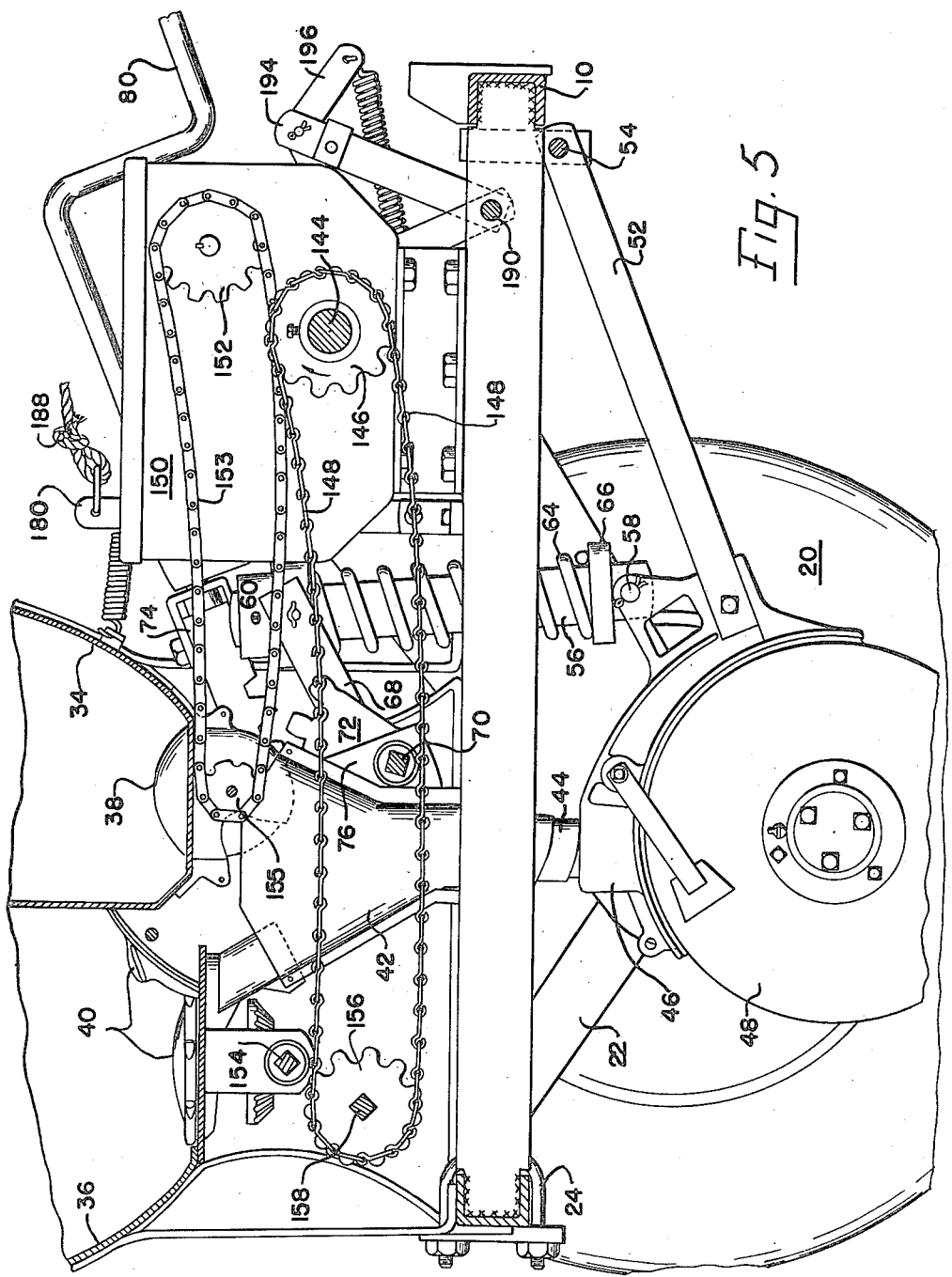

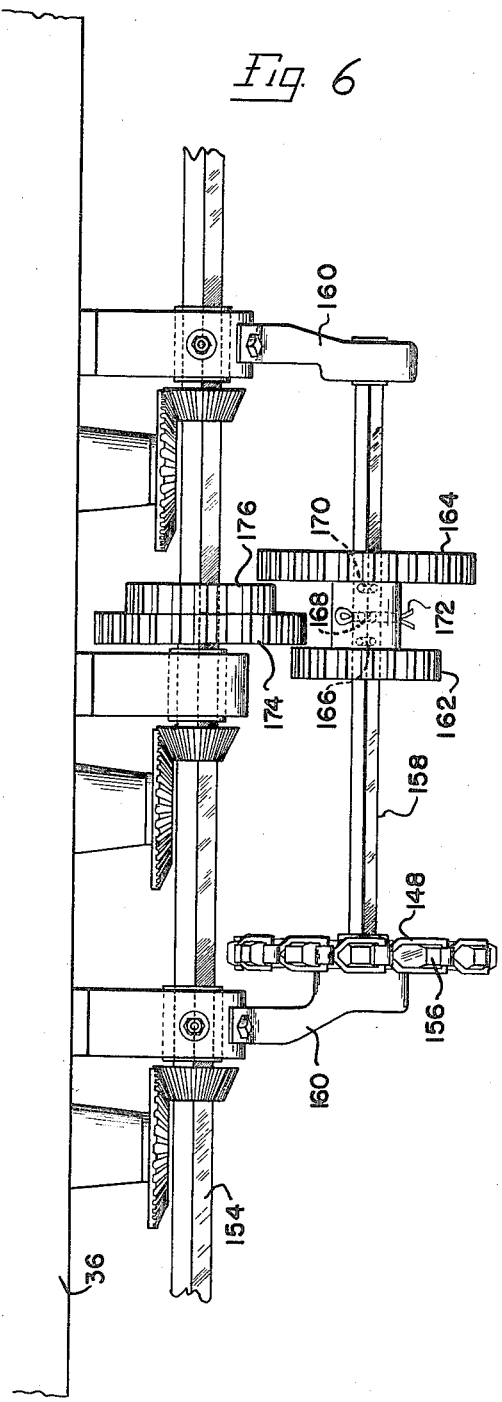

United States Patent Office 2,711,903
Patented June 28, 1955

2,711,903
GRAIN DRILL DRIVE

Wesley A. Harper, Bellevue, Ohio, assignor, by mesne assignments, to Cockshutt Farm Equipment Limited, a corporation of Canada Application July 11, 1950, Serial No. 173,212

2 Claims. (Cl. 275—9)

This invention relates to grain drills, seeders and the like, and particularly to improved drive and operating mechanisms for grain drills.

In the manufacture of grain drills, recent developments have called for larger units than have heretofore been employed. By having a larger unit an area can be seeded in a much shorter time to obvious advantage, but certain difficulties are introduced into the construction and operation of the drill because of the greater size and weight of the parts. For example, the seed and fertilizer feeding devices in a large drill, being greater in number, require a great deal more power to operate. Further, the greater number of openers require more force to be exerted to lift them from the ground. In addition, the construction of the hoppers, drive mechanism, and the like for a large drill, if it is attempted to make these parts in the customary single unit manner become quite large and difficult to handle and machine as well as having severe loads imposed thereon in use.

Accordingly, one object of this invention is the provision of a grain drill or seeder construction of large size but wherein the operating parts, such as drive shafts and the like, are not excessively large and bulky.

Another object of the present invention is to provide an arrangement whereby grain drills and the like can be made of larger size, but wherein none of the functions of the drill will be impaired in any way whatsoever.

It is also an object to provide a grain drill or the like having a fertilizer dispensing unit in which the speed of operation of the fertilizer unit can be selectively adjusted.

A still further particular object is the provision of a unitary transmission through which independent drives to the seeding devices of the seeder pass.

These and other objects and advantages will become more apparent upon reference to the following description taken in connection with the accompanying drawings, in which:

Figure 2 is a view like Figure 1 but showing the left half of the drill and with the hopper and dispensing mechanisms removed;

Figure 3 is a sectional view in enlarged scale taken on line 3—3 of Figure 1 showing the actuating mechanism for the openers of the drill with the mechanism in position to thrust the openers against the ground;

Figure 4 is a sectional view in enlarged scale taken on line 4—4 in Figure 1 and shows the clutch arrangement for controlling the seeder drive with the clutch in its engaged position;

Figure 5 is a sectional view in enlarged scale indicated by line 5—5 on Figure 1 and showing the drives to the seeder and fertilizer feed mechanisms;

Figure 6 is a detail sectional view in enlarged scale indicated by line 6—6 on Figure 2 and showing the fertilizer drive gears.

Figure 1:
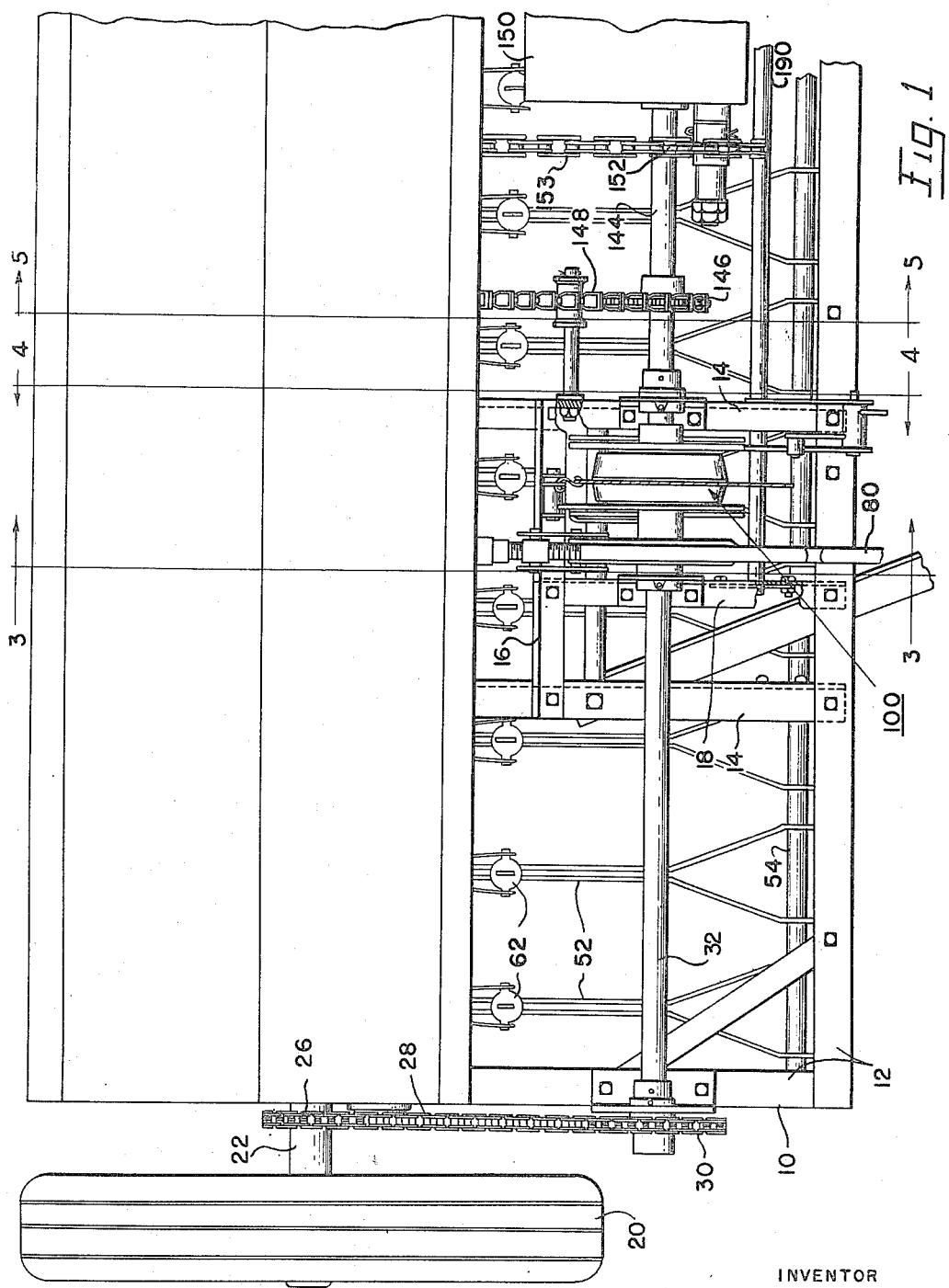
Figure 1 is a fragmentary plan view of the right half of a grain drill constructed according to this invention, showing a portion of the drive mechanism.

Referring to the drawings more in detail, a grain drill constructed according to my invention comprises a frame 10 which may advantageously consist of the interconnected angles and channels indicated at 12. The resulting frame is generally rectangular and may include intermediate cross members, as at 14, on each side. Cross members 14 are connected rearwardly of the front of the frame by an additional cross member 16, and members 14 and 16 together and still another structural member 18 form a platform on each side of the frame adapted for supporting the various operating auxiliaries of the seeder.

At each end of the frame there is mounted a ground wheel 20 by means of an axle 22 which may be secured to the rear frame member, as by the U-bolts 24.

Each wheel 20 drives a sprocket 26 over which passes a chain 28 leading to a sprocket 30 on the end of a drive shaft 32. The two drive shafts 32 are coaxial but are separate and independent in every other respect.

Mounted on the frame of the drill is a hopper which may comprise a forward seed part 34 and the rearwardly disposed fertilizer part 36. Hopper 34 has feed mechanism 38 associated therewith and hopper 36 has the feed mechanism 40. These mechanisms may be of any suitable type and are adapted for discharging material such as seed and fertilizer from the hopper, when driven. This material discharges into the funnel arrangements 42 that lead downwardly through the flexible tubes 44 to the openers of the drill that are indicated at 46.

The openers 46 may be of any suitable type, such as single disk or double disk, or may be of the shoe type, according to individual preference. There is illustrated in the drawings double disk type openers, and these comprise a pair of disks 48 mounted at a forwardly converging angle on a frame 50. As many of the furrow openers as are necessary may be employed, and in the instant application, there are shown eight on each side of the center line of the drill. For each furrow opener, of course, there is a feeding mechanism in each of the seed and fertilizer hoppers.

According to the present invention, the hoppers may be continuous from end to end, but the feed mechanisms on opposite sides of the center line of the mechanism and the device for raising and lowering the disk openers are independent. This materially reduces the loads imposed on the driving mechanisms for the feeding device and the opener actuating device.

Returning again to the disk openers, each of the disk opener frames 50 has a drag mechanism connected thereto, as represented by bar 52 that extends forwardly to be pivotally mounted adjacent the front of the drill frame, as by the shaft 54. Also pivotally mounted on each of the disk opener frames is an upwardly extending lift rod or bar 56 which is connected with the opener frame by pin 58 and which has at its upper end a collar 60. A collar 62 is slidable on each lift bar and a compression spring 64 bears between the under side of each collar 62 and a lower collar 66 on the lift bar.

As may be seen in Figures 2 and 3, each collar 62 is connected with the outer end of a lift fork 68, the other end of which is clamped to the rectanglar lift shaft 70. Shaft 70, similarly to the hopper arrangement, is in two parts, one for each side of the drill, and each controlling eight of the lift forks 68.

One each shaft 70 there is mounted a gear sector 72 that meshes with a rack 74 reciprocable in a guide frame 76. The end of rack 74 carries a clip 78 which rotatably receives an end of a crank 80. Crank 80 is threaded through a nut 82 having a trunnion mounting on the upper end of an arm 84 pivoted, as at 86, to one of the frame members. It will be apparent at this point that movement of arm 84 counterclockwise about its pivot, as viewed in Figure 3, will also bring about counterclockwise movement of the lifting forks associated therewith to lift their respective disk openers.

The disk openers in their lowered positions are depicted in Figure 3. As will be seen hereinafter, each of the two arms 84 are adapted for being moved between their two operative positions by a shoe 88 pivoted thereto at 90 and encompassing an eccentric cam 92 adapted for being driven by the adjacent drive shaft 32.

Turning again to the drive, each of the shafts 32 extends into a clutch mechanism, generally indicated at 100, and there being one of these clutch mechanisms for each side of the drill, as will be seen from Figures 1 and 2. The clutch mechanism employed is disclosed in U. S. Patent No. 2,687,702 which is a division of this invention. What is provided in connection with eccentric 92 is a one-half revolution clutch which can be automatically actuated to connect eccentric 92 with shaft 32 for a half revolution at any time.

Associated with the clutch 100 is a similar arrangement consisting of a plate 130 having an external arm 132 pivoted thereto and connected with the internal arm 134 carrying drive roller 136 at one end and having a spring 138 connected to the other end. Similarly to plate 112, plate 130 has notched protuberances 140 which operate in the same manner as the protuberances 122 of plate 112. Plate 130 is keyed, as by a key 142, to a shaft 144. Each shaft 144, as will be seen in Figures 1 and 2, mounts a sprocket 146 over which passes the fertilizer drive chain 148. The shafts 144 also extend into a unitary central drive transmission case 150, and therein are drivingly connected with the respective seeder drive sprockets 152. The transmission 150 is adapted for varying the speed ratio between the shafts 144 and their respective driven sprockets 152.

The connection of the fertilizer drive chain 148 with the fertilizer drive shaft 154 is indicated in Figures 5 and 6. In these figures it will be seen that the chain 148 drives a sprocket 156 on a rectangular countershaft 158 supported in frame members 160 beneath the fertilizer hopper. Slidably mounted on shaft 158 is a compound gear comprising a small gear 162 and a larger gear 164. Shaft 158 is drilled, as at 166, 168, and 170, and the compound gear may be pinned in alignment with any one of these holes by means of a wire clip 172. The arrangement is such that gear 162 can be caused to mesh with gear 174 on the drive shaft 154, gear 164 can be caused to mesh with gear 176 on the said drive shaft, or the compound gear can be positioned so none of the gears are meshing.

It has been mentioned before that the actuation of the clutch for disconnecting the seeder and fertilizer drives is automatic and takes place when the disk openers are lifted to their idle position. The manner in which this is brought about will be seen on reference to Figures 3 and 4. In these views, it will be noted that for each of the clutch mechanisms there is an L-shaped lever 180 pivoted to the frame, as at 182, and having a roller 184 that is caused to bear against the periphery of plate 112 by spring 186 acting on the lever. This lever controls the driving of plate 112, and there is one of these levers for each of the two said plates.

Normally, the lever holds plate 112 and its associated eccentric stationary, but the lever can be shifted by pulling rope 188 so as to release the said plate, whereupon it will make a one-half revolution and again halt when the roller falls into the notch on the other side of the said plate. The two ropes 188 for the two levers are preferably connected together for the simultaneous actuation of the two levers, but, optionally, the levers may be individually actuated should it be desired at any time to lift one set of disk openers and leave the others lowered. This might come about when it became necessary to finish out a field by running the seeder so that it would only plant eight rows.

For actuating the clutches associated with the seeder and fertilizer drives, there is a rock shaft 190 in the frame having thereon a pair of arms 192, each of which has pivoted, as at 194, a lever 196 having an actuating roller 198 adapted for engagement with the periphery of the adjacent plate 130. Connected with the rock shaft 190 is another arm 200 that has its upper end connected by a link 202 with a point on one of the lift arms 84 so that when the lift arm is moved, the arm 200 also moves to turn rock shaft 190, thereby to move arm 192. The arrangement is such that when the disks are down, as in Figures 3 and 4, arm 192 holds roller 198 away from plate 130, thus leaving the plates 130 drivingly connected with the clutch housing and the seeder and fertilizer drives in operation.

However, when the openers are lifted, arms 192 are shifted, which brings rollers 198 against the peripheries of their plates 130, thereby bringing about disengagement of the drives to the seeder and fertilizer mechanisms. In this manner the disconnecting of the seeder and fertilizer drives is automatic whenever the disks are lifted.

It will be apparent that while only one arm 200 has been shown so that both of the seeder clutches are disconnected at one time, there could be two of these arms so that the seeder and fertilizer drives for the two sides would be independently actuated by the lifting of their associated openers.

It has been pointed out that the cranks 80 are threaded, and the purpose of this is to adjust the elevation of the openers to bring them into proper engagement with the ground when seeding conditions and ground conditions vary. It will be noted, however, that the adjustment of the openers by adjustment of the cranks 80 does not in any way effect the operation of the lifting mechanism and the clutch units.

From the foregoing, it will be seen that what I have provided is a seeder arrangement adapted for being made in large sizes but with the mechanism arranged in two units so that no undue operating loads are placed on any of the auxiliaries. Both ground wheels are utilized as driving elements and each serves to drive the fertilizer and seeder drives of the adjacent hoppers, as well as serving to actuate the lift cam for the adjacent openers.

The construction of my drill is relatively compact, and the operating parts are so located that all can be readily serviced at any time. The hopper unit and the drive unit are so arranged that they can be produced in the form of subassemblies, and thereafter brought together with the frame to construct the drill as illustrated, many obvious manufacturing advantages obtaining from this type of construction.

It will be understood that this invention is susceptible to modification in order to adapt it to different usages and conditions, and, accordingly, it is desired to comprehend such modifications within this invention as may fall within the scope of the appended claims.

I claim:

1. In a grain drill, an elongated rectangular frame, a pair of ground wheels mounted on said frame and supporting the same for movement over the ground in a direction of travel, each wheel being mounted on said frame for independent rotation with the axes of said wheels being axially aligned and extending transversely of said direction of travel, a pair of adjoining elongated hopper means mounted on the rear portion of said frame and generally parallel to said wheel axes, like pluralities of feed means spaced in each of said hopper means, a pair of transversely extending axially aligned feed shafts mounted on and beneath each of said hopper means and drivingly connected to the feed means therein, a pair of transversely extending axially aligned countershafts mounted beneath one of said hopper means and respectively drivingly connected to the associated pair of feed shafts, a drive transmission mounted on said frame centrally thereof and forwardly of said hopper means, a connecting shaft extending laterally from each end of said drive transmission with the inner end of each connecting shaft operatively connected thereto, separate clutch means on the outer end of each of said connecting shafts, a drive shaft operatively connected to each of said clutch means and extending laterally therefrom, means drivingly connecting each drive shaft with the adjacent one of said wheels, means drivingly connecting each of said connecting shafts with the adjacent one of said countershafts, means drivingly connecting said transmission with the remaining pair of feed shafts, and separate control means for each of said clutch means; whereby said clutch means may be selectively operated collectively or individually.

2. In a grain drill, an elongated rectangular frame, a pair of ground wheels mounted on said frame and supporting the same for movement over the ground in a direction of travel, each wheel being mounted on said frame for independent rotation with the axes of said wheels being axially aligned and extending transversely of said direction of travel, a first elongated hopper means mounted on the rear portion of said frame substantially parallel to said wheel axes, a second elongated hopper means mounted on said frame forwardly of and adjoining said first hopper means, a plurality of feed means spaced in said first hopper means, and a like plurality of feed means spaced in said second hopper means, a pair of transversely extending axially aligned first feed shafts supported from and located beneath said first hopper means and drivingly connected to the feed means therein, a pair of transversely extending axially aligned second feed shafts supported from and located beneath said second hopper means and drivingly connected to the feed means therein, a pair of transversely extending axially aligned countershafts supported from said first hopper means and located beneath said first feed shafts with a countershaft for each of the first feed shafts and driving means therebetween, a drive transmission means mounted on said frame centrally thereof and forwardly of said second hopper means, a pair of transversely extending axially aligned first connecting shafts extending laterally from a respective end of said drive transmission with the inner end of each connecting shaft operatively connected thereto, separate clutch means on each connecting shaft at the outer end thereof, a drive shaft operatively connected to each of said clutch means and extending laterally therefrom in axial alignment with said connecting shafts, drive means connecting each drive shaft with the adjacent one of said ground wheels, chain drive means directly connecting each of said first connecting shafts with the adjacent one of said countershafts, a pair of transversely extending axially aligned second connecting shafts extending laterally from a respective end of said drive transmission with the inner end of each second connecting shaft operatively connected thereto, chain drive means directly connecting each of said second connecting shafts with the adjacent one of said second feed shafts, and separate control means for each of said clutch means; whereby said clutch means may be selectively operated collectively or individually.

References Cited in the file of this patent

UNITED STATES PATENTS

| Number | Name | Date |
|---|---|---|
| 424,541 | Davis | Apr. 1, 1890 |
| 564,550 | Benham | July 21, 1896 |
| 638,637 | La Clair | Dec. 5, 1899 |
| 694,598 | Armitage | Mar. 4, 1902 |
| 756,315 | Bain | Apr. 5, 1904 |
| 763,867 | Elliott | June 28, 1904 |
| 799,781 | Dennis | Sept. 19, 1905 |
| 1,405,001 | Reichelt | Jan. 31, 1922 |
| 1,463,613 | Davis | July 31, 1923 |
| 1,514,700 | Harris | Nov. 11, 1924 |
| 1,751,951 | Schaeffer | Mar. 25, 1930 |
| 1,806,050 | Fischer | May 19, 1931 |
| 1,842,059 | Alegria | Jan. 19, 1932 |
| 2,443,491 | Andres | June 15, 1948 |
| 2,522,693 | Stiteler | Sept. 19, 1950 |

FOREIGN PATENTS

| 174,962 | Canada | Feb. 6, 1917 |